(12) United States Patent
Paluncic et al.

(10) Patent No.: US 8,365,867 B2
(45) Date of Patent: Feb. 5, 2013

(54) FEEDING LUBRICATING DEVICE

(75) Inventors: Zdravko Paluncic, Ludwigshafen (DE); Andreas Schoenfeld, St. Leon-Rot (DE)

(73) Assignee: Lincoln GmbH, Walldorf (DE)

( * ) Notice: Subject to any disclaimer, the term of this patent is extended or adjusted under 35 U.S.C. 154(b) by 878 days.

(21) Appl. No.: 11/910,926

(22) PCT Filed: Mar. 11, 2006

(86) PCT No.: PCT/EP2006/002255
§ 371 (c)(1),
(2), (4) Date: Oct. 8, 2007

(87) PCT Pub. No.: WO2006/108478
PCT Pub. Date: Oct. 19, 2006

(65) Prior Publication Data
US 2008/0202854 A1  Aug. 28, 2008

(30) Foreign Application Priority Data
Apr. 12, 2005  (DE) ............... 20 2005 005 916 U

(51) Int. Cl.
*F16N 27/00* (2006.01)
(52) U.S. Cl. ........................................ 184/7.4
(58) Field of Classification Search ........... 184/7.4
See application file for complete search history.

(56) References Cited

U.S. PATENT DOCUMENTS

| | | | | |
|---|---|---|---|---|
| 2,044,814 A * | 6/1936 | Rothrock | ............... | 417/520 |
| 2,308,974 A * | 1/1943 | Harper | ............... | 417/510 |
| 2,585,189 A * | 2/1952 | Tear | ............... | 184/7.4 |
| 2,606,496 A * | 8/1952 | Hajek | ............... | 417/485 |
| 2,817,725 A * | 12/1957 | Rochfort et al. | ............... | 200/47 |
| 3,294,075 A * | 12/1966 | Gratzmuller | ............... | 417/490 |
| 4,006,797 A * | 2/1977 | Keske | ............... | 184/27.1 |
| 4,143,995 A * | 3/1979 | Divisi | ............... | 417/3 |
| 4,620,836 A * | 11/1986 | Brandl | ............... | 417/364 |
| 5,165,502 A * | 11/1992 | Hirose et al. | ............... | 184/7.4 |
| 5,219,040 A * | 6/1993 | Meuer et al. | ............... | 184/7.4 |
| 6,461,117 B2 * | 10/2002 | Thomas | ............... | 417/279 |

FOREIGN PATENT DOCUMENTS

| | | |
|---|---|---|
| EP | 0473385 A1 | 3/1992 |
| EP | 1052445 A1 | 11/2000 |
| GB | 2044411 A | 10/1980 |

OTHER PUBLICATIONS

English translation of International Search Report re PCT/EP2006/002255 dated Nov. 9, 2006, 5 pages.
International Search Report re PCT/EP2006/002255 dated Nov. 9, 2006, 2 pages.

* cited by examiner

*Primary Examiner* — Michael Mansen
*Assistant Examiner* — Mark K Buse
(74) *Attorney, Agent, or Firm* — Senniger Powers LLP

(57) ABSTRACT

The invention relates to a feeding lubricating device comprising a lubricant reservoir (1), a lubricant pump (2) which is driven by a driving motor (16) and is provided with at least one pump element (3) for conveying lubricant to at least one lubrication point, especially at least one feeding distributor (5), via a lubricant conduit (4), a driving member such as a drive shaft, and optional means that are fitted with an eccentric attachment for generating at least one pump stroke of the at least one pump element (3). A pressure relief unit (8) which can also be actuated via the driving member blocks a backflow pipe (4) located between the lubricant conduit (4) and the lubricant reservoir (1) in a pressure phase while unblocking the same in a subsequent relief phase.

14 Claims, 2 Drawing Sheets

Figure 2:
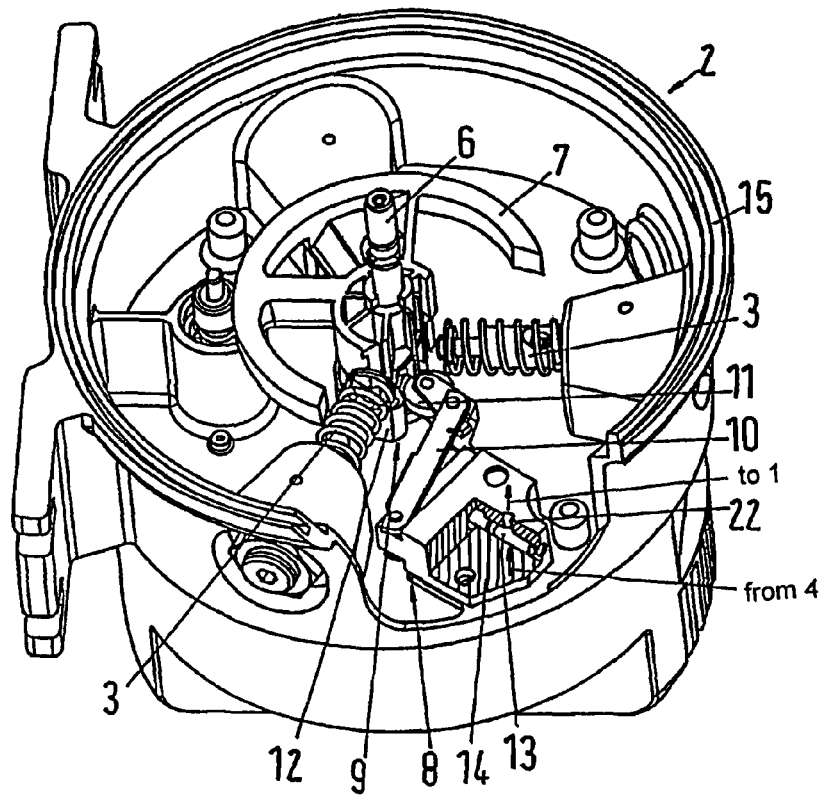

FIG. 1
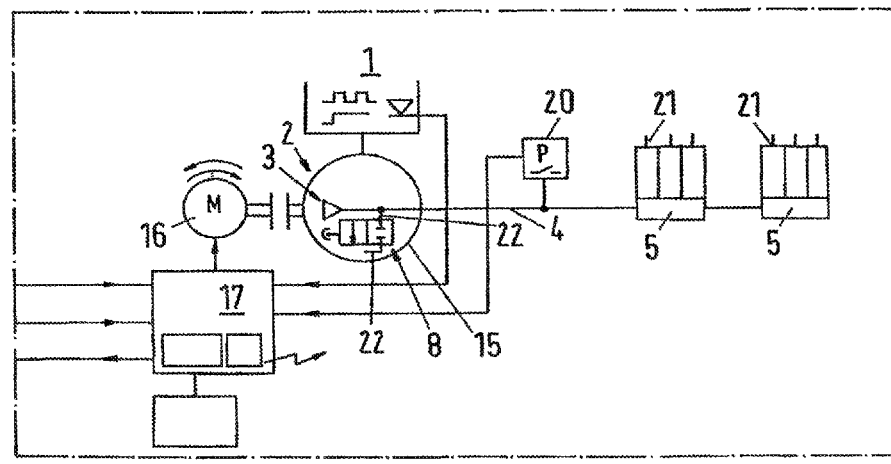
FIG. 4d
FIG. 4a   FIG. 4b   FIG. 4c
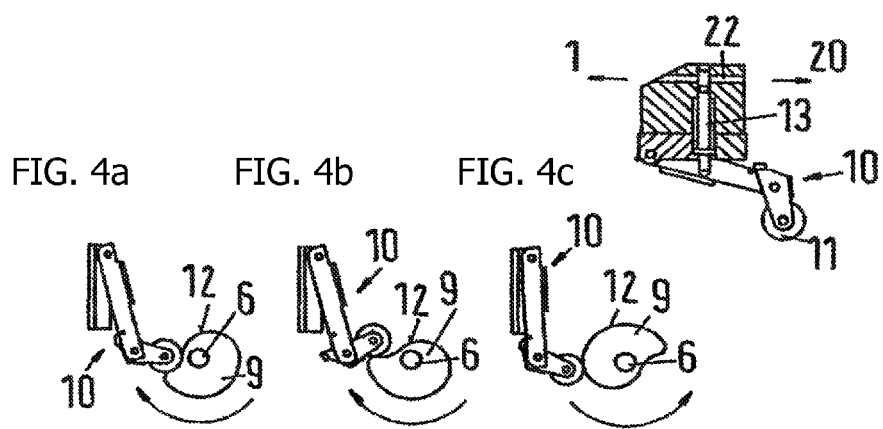

FEEDING LUBRICATING DEVICE

This invention relates to a feeding lubricating device comprising a lubricant reservoir and a lubricant pump, which can be driven by a drive motor, with at least one pump element for conveying lubricant via a lubricant conduit to at least one lubrication point, in particular at least one feeding distributor, and comprising a drive member, such as a drive shaft, and possibly means including an eccentric for generating at least one pump stroke of the at least one pump element.

In such feeding lubricating devices, it should be achieved in a rather simple way that after a pressure phase, in which lubricant is supplied to the at least one lubrication point, a relief phase is initiated, in which excess lubricant is recirculated to the lubricant reservoir. It is the object of the invention to satisfy this requirement as reliably as possible.

The solution in accordance with the invention for instance substantially consists in that in a feeding lubricating device as mentioned above, a pressure relief means is provided, which can also be actuated via the drive member for the at least one pump element and blocks a return conduit between the lubricant conduit and the lubricant reservoir in a pressure phase and unblocks the same in a subsequent relief phase.

Upon supplying the at least one lubrication point with lubricant, the pressure relief thus is achieved in a simple way by largely utilizing the already existing parts of the device.

In accordance with a development of the invention, the pressure relief unit can be actuatable by a cam disk or a similar actuating element which is seated on the drive member such as the drive shaft.

In a special aspect of the invention it is provided that the pressure relief unit includes a rocker mechanism actuatable by the actuating element.

Preferably, the pressure relief unit rests against a cam surface of the actuating element via a wheel or similar transmission element.

Opening and closing the connection between lubricant conduit and lubricant reservoir for recirculating lubricant can for instance be effected in a constructively simple way in that the pressure relief unit includes an axially movable control piston which blocks the return conduit between the lubricant conduit and the lubricant reservoir in the pressure phase and unblocks the same in the subsequent relief phase, for instance due to a groove extending around the circumferential surface of the control piston.

In the proposed feeding lubricating device, the pressure relief phase can be initiated in a simple way by reversing the direction of movement of the drive member with the actuating element.

A compact construction of the feeding lubricating device is obtained in particular when the at least one pump element and the pressure relief unit are accommodated in a common pump housing.

The drive motor, possibly with the associated transmission, can be attached for instance to the bottom of the pump housing.

When several pump elements are provided, the invention furthermore proposes, independent of the pressure relief unit, that said pump elements are in flow connection with each other, possibly via lubricant passages provided at or in the bottom of the pump housing.

Further objectives, features, advantages and possible applications of the invention can be taken from the following description of embodiments with reference to the drawings. All features described and/or illustrated per se or in any combination form the subject-matter of the invention, independent of their inclusion in individual claims or their back-reference.

Figure 3:
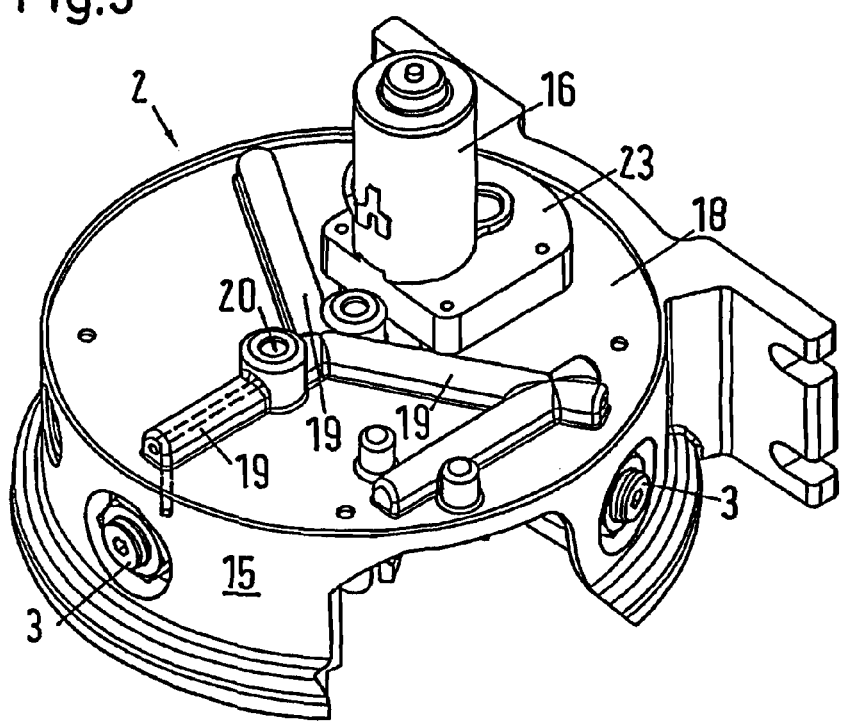

In the drawings:

FIG. 1 shows a schematic representation of a feeding lubricating device incorporating the invention, FIG. 2 in an inclined view from the top, opened and partly cut away, schematically shows a lubricant pump which can be used when realizing the invention, FIG. 3 shows the lubricant pump of FIG. 2, as seen from below, and FIG. 4 schematically shows an embodiment of a pressure relief unit formed with a rocker mechanism in the lubricant pump as shown in FIGS. 2 and 3.

As shown in FIG. 1, the feeding lubricating device of the invention includes a lubricant pump 2 whose pump elements 3 are actuated by an electric drive motor 16, in order to convey lubricant from a lubricant reservoir 1 into a lubricant conduit 4. The lubricant conduit 4 leads to two (in the illustrated case) feeding distributors 5, from which corresponding supply conduits 21 are branched off to the individual lubrication points. In the lubricant conduit 4, a pressure switch 20 is provided, which shuts off the further supply of lubricant by sending a corresponding signal to the drive motor 16 via a control 17, when a specified maximum pump pressure is reached. Via the control 17, the lubricant level in the lubricant reservoir 1 is also monitored.

In FIG. 1, it is also indicated that apart from the one or more pump elements 3, the pump housing 15 also includes a pressure relief unit. The pressure relief unit 8 is incorporated in a return conduit 22, which connects the lubricant conduit 4 between pump element 3 and pressure switch 20 with a lubricant reservoir 1. In the pressure phase, during which the lubrication points should be supplied with lubricant, the pressure relief unit 8 closes the return conduit 22, but opens the same in a subsequent relief phase.

FIG. 2 illustrates an exemplary construction of an inventive lubricant pump 2 with such a pressure relief unit 8. It can be seen that the three (in the illustrated case) pump elements 3 are periodically actuated by the motor 16 via a drive member 6 constituting a drive shaft and by an eccentric 7 (shown in a partly cutaway representation) rotating like a wheel with the drive member 6, in order to convey lubricant to the lubricant conduit 4. Such pump element 3 for instance has a delivery piston, which against the action of a return spring can perform a stroke by acting on the eccentric 7, in order to discharge a certain amount of lubricant from a lubricant chamber in the direction of the lubricant conduit 4.

On the drive member 6, an actuating element 9 constituting a cam disk is seated in accordance with the invention, which with its cam surface 12 acts on a rocker mechanism 10 via a transmission element 11 constituting a wheel. The rocker mechanism 10 on the one hand cooperates with a control piston 13, which in the pressure phase blocks the return conduit 22 between the at least one lubrication point, in particular the pressure switch 20, and the lubricant reservoir 1. In a relief phase subsequent to the pressure phase, by reversing the direction of rotation of the cam disk 9, as shown in detail in FIG. 4, the control piston 13, which on its circumference has a circumferential groove 14, is pushed into a position in which the return conduit 22 is unblocked between the at least one lubrication point and the lubricant reservoir 1, so that pressurized, non-used lubricant is recirculated to the lubricant reservoir 1. In adaptation to the cam surface 12 of the cam disk 9, as shown in FIG. 4, the rocker arrangement is made such that in the pressure phase, i.e. during the rotation of the cam disk 9, there is no power transmission to the rocker mechanism 19 in forward direction. This will only be the case when in the relief phase the cam disk 9 is rotated in the reverse direction by the drive member 6.

FIG. 3 shows that the drive motor 16 and the transmission 23 can be attached to the bottom 18 of the pump housing 15 for creating an assembly. FIG. 3 furthermore shows that at the bottom 18 of the pump housing 15 there is also provided the pressure switch 20 and the individual pump elements 3 communicate with each other via lubricant passages 19 provided at the bottom 18.

LIST OF REFERENCE NUMERALS

1 lubricant reservoir
2 lubricant pump
3 pump elements
4 lubricant conduit
5 feeding distributor
6 drive member, such as drive shaft
7 eccentric
8 pressure relief unit
9 actuating element, such as cam disk
10 rocker mechanism
11 transmission element, such as wheel
12 cam surface
13 control piston
14 groove
15 pump housing
16 drive motor
17 control
18 bottom
19 lubricant passages
20 pressure switch
21 supply conduits
22 return conduit
23 transmission

The invention claimed is:

1. A feeding lubricating device comprising a lubricant reservoir, a pump housing, a lubricant pump in the pump housing drivable by a drive motor having a rotatable drive shaft, said lubricant pump comprising at least one pump element for conveying lubricant via a lubricant conduit to at least one lubrication point, and an eccentric on the drive shaft for generating at least one pump stroke of the at least one pump element, characterized by a pressure relief unit which blocks a return conduit fluidly connecting the lubricant conduit and the lubricant reservoir in a pressure phase and unblocks the same in a subsequent relief phase, wherein the pressure relief unit is actuated by rotation of a cam disk on the drive shaft, and wherein the pressure relief unit includes a rocker mechanism comprising a transmission element resting against a cam surface of the cam disk, said rocker mechanism being configured such that rotation of the drive shaft and the cam disk through a full rotation in one direction results in no transmission of power to the rocker mechanism to unblock the return conduit during said pressure phase, and such that rotation of the drive shaft and cam disk in a reverse direction results in transmission of power to the rocker mechanism to unblock the return conduit during said relief phase.

2. The feeding lubricating device according to claim 1, wherein the transmission element is a wheel.

3. The feeding lubricating device according to claim 2, characterized in that the pressure relief unit includes an axially movable control piston which blocks the return conduit between the lubricant conduit and the lubricant reservoir in the pressure phase and unblocks the same in the subsequent relief phase.

4. The feeding lubricating device according to claim 3, characterized in that the pressure relief unit includes said axially movable control piston which blocks the return conduit between the lubricant conduit and the lubricant reservoir in the pressure phase and unblocks the same in the subsequent relief phase due to a groove extending around the circumferential surface of the control piston.

5. The feeding lubricating device according to claim 1, characterized in that said at least one pump element and the pressure relief unit are accommodated in the pump housing.

6. The feeding lubricating device according to claim 5, comprising a plurality of pump elements, characterized in that the pump elements are in flow connection with each other.

7. The feeding lubricating device according to claim 6, wherein the pump elements are in flow connection with each other via lubricant passages provided at or in the bottom of the pump housing.

8. The feeding lubricating device according to claim 1, characterized in that the pressure relief unit includes an axially movable control piston, which blocks the return conduit between the lubricant conduit and the lubricant reservoir in the pressure phase and unblocks the same in the subsequent relief phase.

9. The feeding lubricating device according to claim 1, further characterized in that said at least one pump element and the pressure relief unit are accommodated in said pump housing.

10. The feeding lubricating device according to claim 9, further characterized in that the drive motor is attached to the pump housing.

11. The feeding lubricating device according to claim 10, characterized in that the drive motor and an associated transmission are attached to a bottom of the pump housing.

12. The feeding lubricating device according to claim 1, comprising a plurality of pump elements, characterized in that the pump elements are in flow connection with each other.

13. The feeding lubricating device according to claim 12, further characterized in that the pump elements are in flow connection with each other via lubricant passages provided at or in a bottom of the pump housing.

14. The feeding lubricating device according to claim 1, wherein said pressure relief unit operates independent of the pressure in the lubricant conduit, the pressure in the return conduit, and the pressure in the reservoir.

* * * * *